United States Patent
Ishikura et al.

(10) Patent No.: US 7,833,378 B2
(45) Date of Patent: Nov. 16, 2010

(54) METHOD FOR MANUFACTURING OPTICAL DISC AND OPTICAL DISC

(75) Inventors: Kazunori Ishikura, Takasaki (JP);
Keiichi Kagawa, Takasaki (JP); Izumi Igawa, Takasaki (JP); Hidetoshi Egawa, Takasaki (JP); Yuji Shibuya, Takasaki (JP); Shinji Miki, Takasaki (JP); Kiyoto Takizawa, Sakaki-machi (JP)

(73) Assignees: Taiyo Yuden Co., Ltd., Tokyo (JP);
Nissei Plastic Industrial Co., Ltd., Nagano-ken (JP)

( * ) Notice: Subject to any disclaimer, the term of this patent is extended or adjusted under 35 U.S.C. 154(b) by 311 days.

(21) Appl. No.: 11/923,892

(22) Filed: Oct. 25, 2007

(65) Prior Publication Data
US 2008/0057259 A1 Mar. 6, 2008

Related U.S. Application Data

(62) Division of application No. 11/093,084, filed on Mar. 29, 2005, now Pat. No. 7,303,381.

(30) Foreign Application Priority Data
Mar. 30, 2004 (JP) .............................. 2004-100217

(51) Int. Cl.
*B29C 47/00* (2006.01)
(52) U.S. Cl. ................... 156/245; 425/143; 425/548; 425/588; 264/1.33; 264/328.16
(58) Field of Classification Search ................. 156/245; 425/143, 144, 548, 552, 588; 264/1.33, 328.16
See application file for complete search history.

(56) References Cited

U.S. PATENT DOCUMENTS

| 4,971,548 | A |   | 11/1990 | Asai |          |
|-----------|---|---|---------|------|----------|
| 5,376,317 | A | * | 12/1994 | Maus et al. | 264/40.6 |

FOREIGN PATENT DOCUMENTS

| JP | 08-224763 A | 9/1996 |
| JP | 2000-37729 A | 2/2000 |
| JP | 2000-71301 A | 3/2000 |
| JP | 2001-232666 A | 8/2001 |
| JP | 2003-71899 | 3/2003 |
| TW | 0537959 B | 6/2003 |
| TW | 0550161 B | 9/2003 |
| TW | 0558490 B | 10/2003 |

OTHER PUBLICATIONS

English abstract and computer translation of JP 2003-71899, Mar. 12, 2003.
English abstract and computer translation of JP 2001-232666, Aug. 28, 2001.

* cited by examiner

*Primary Examiner*—John L Goff
(74) *Attorney, Agent, or Firm*—Knobbe Martens Olson & Bear LLP

(57) ABSTRACT

A method of manufacturing an optical disc includes molding a first disc substrate by a first mold simultaneously with a second disc substrate by a second mold while controlling the temperature of the first and second molds by passing a temperature-controlling medium through temperature controlling flow passages provided in the vicinity of a boundary between the first and second molds.

6 Claims, 8 Drawing Sheets

[Figure 1]
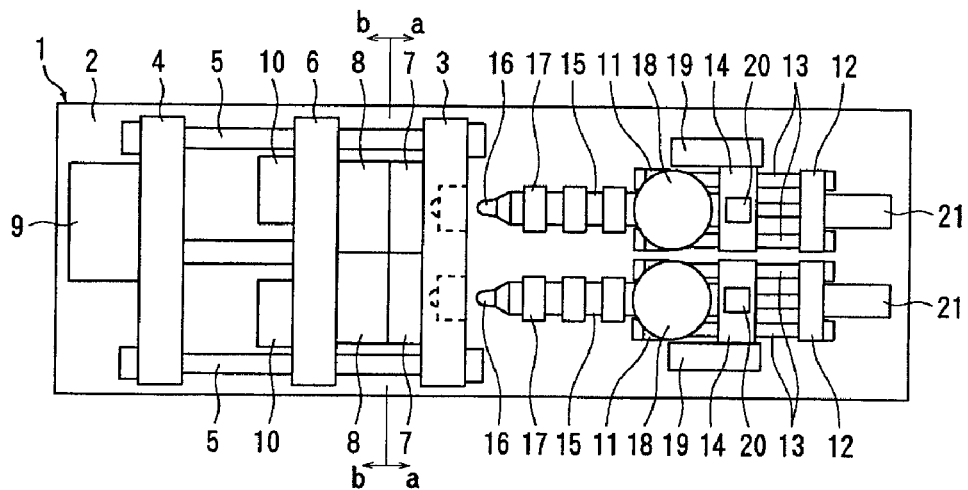
[Figure 2]
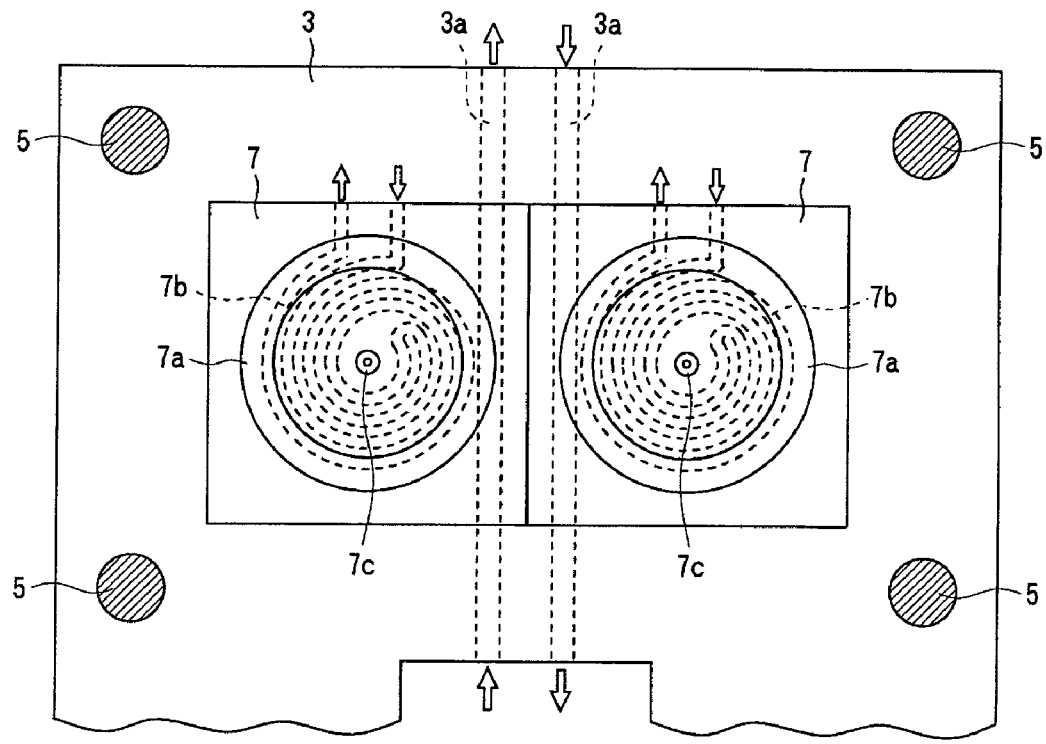

[Figure 3]
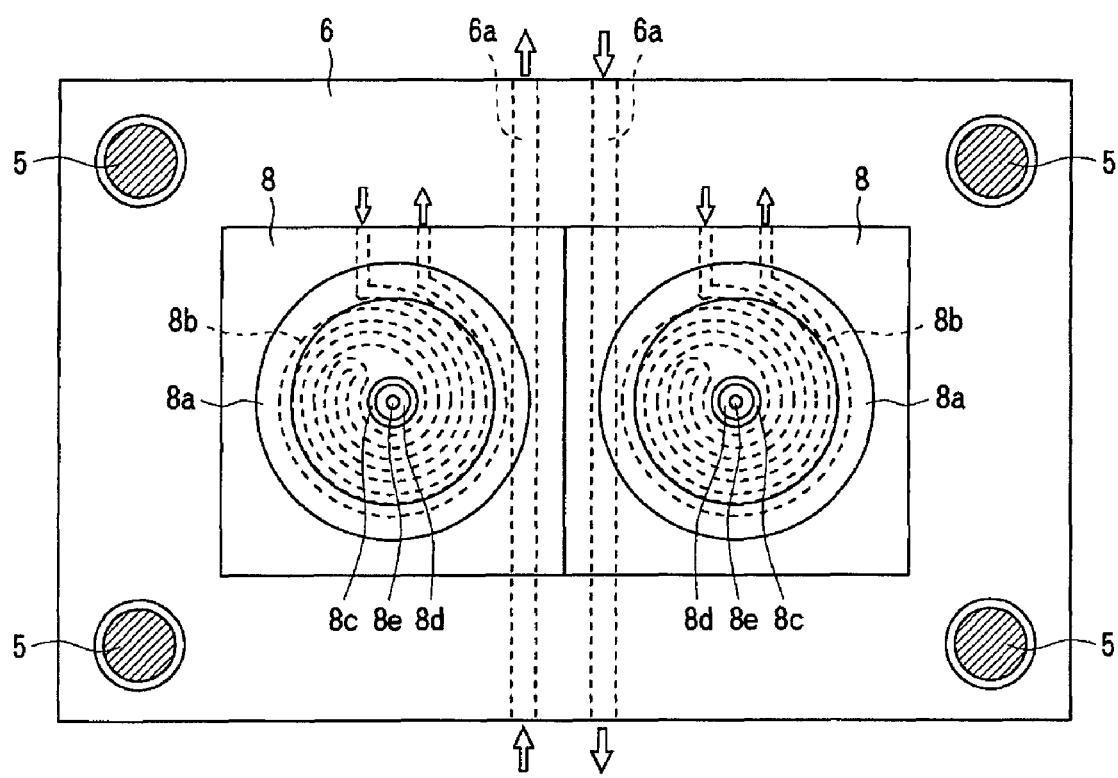

[Figure 4]
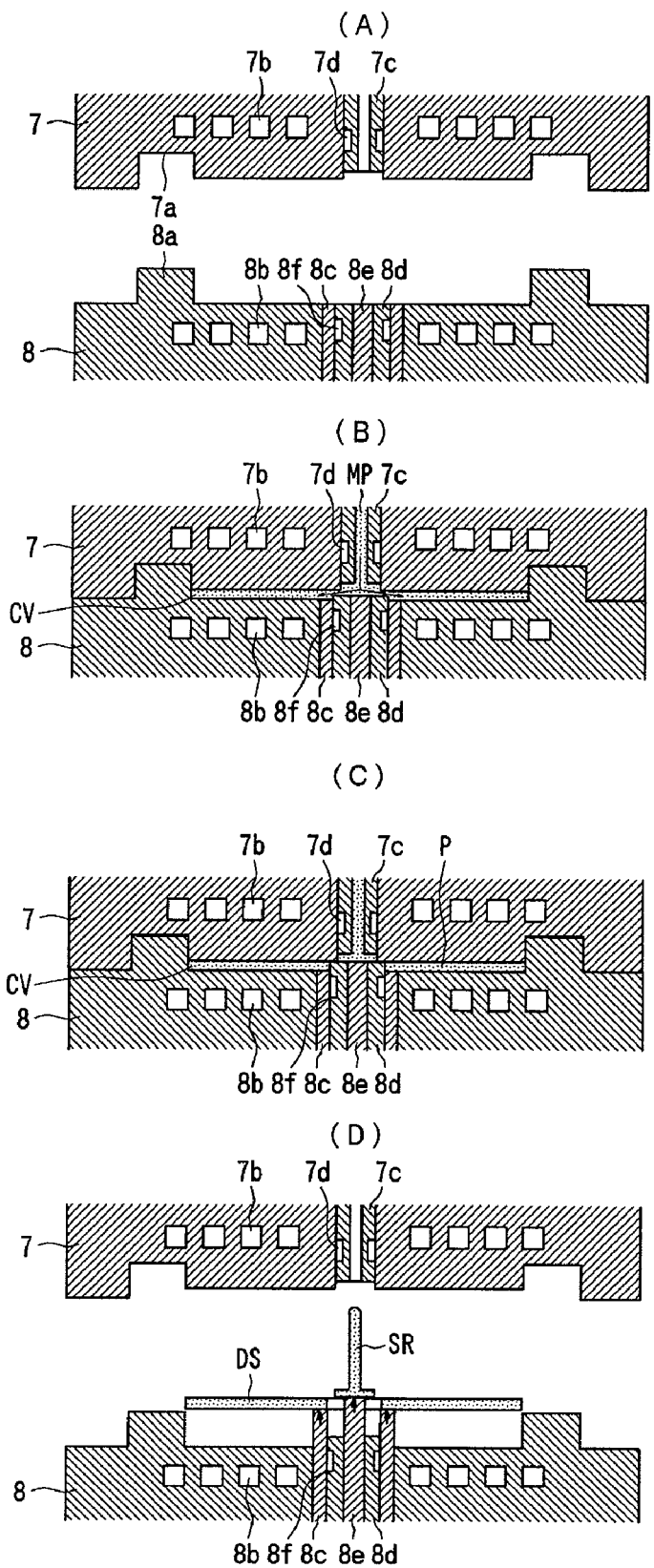

[Figure 5]
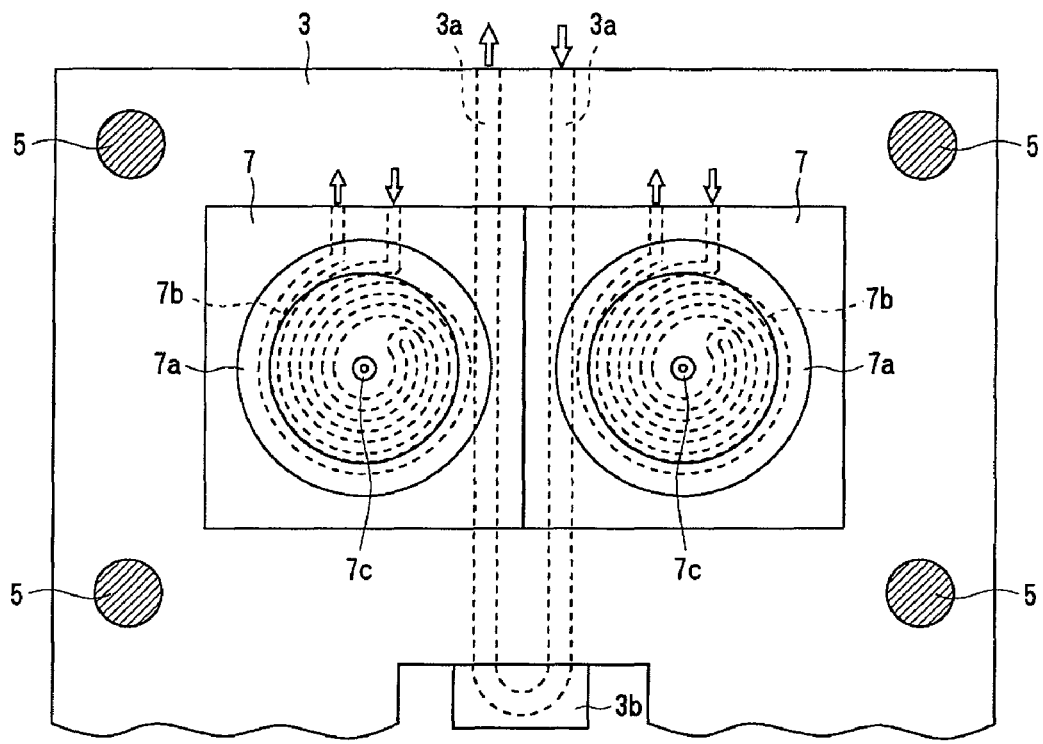
[Figure 6]
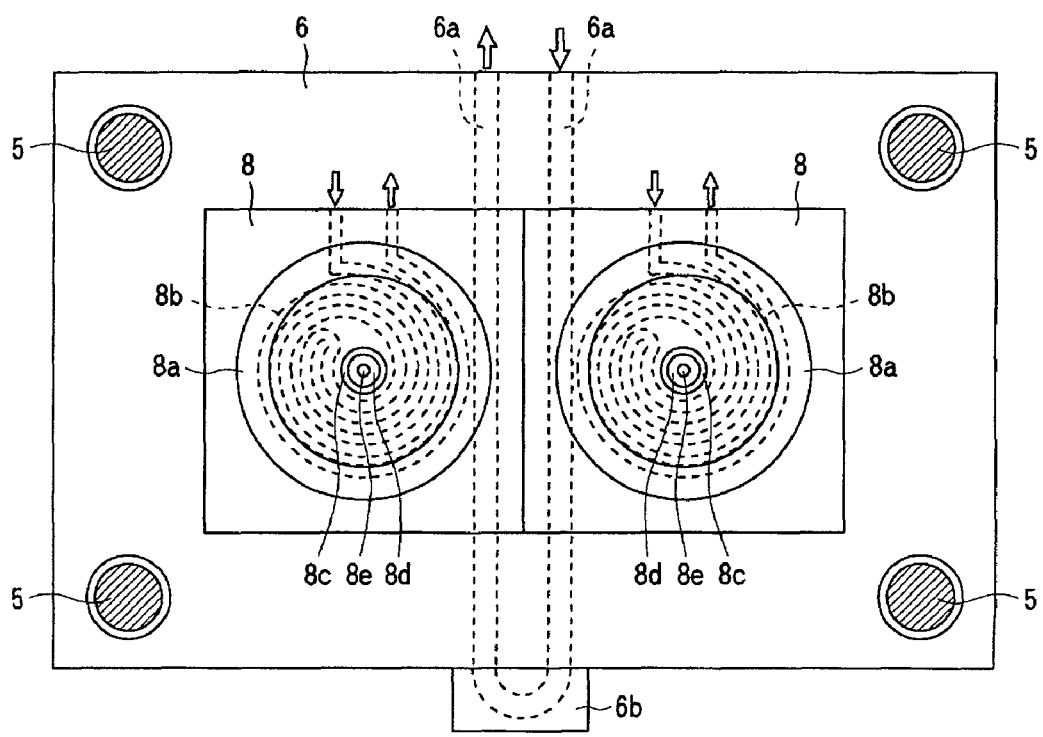

[Figure 7]
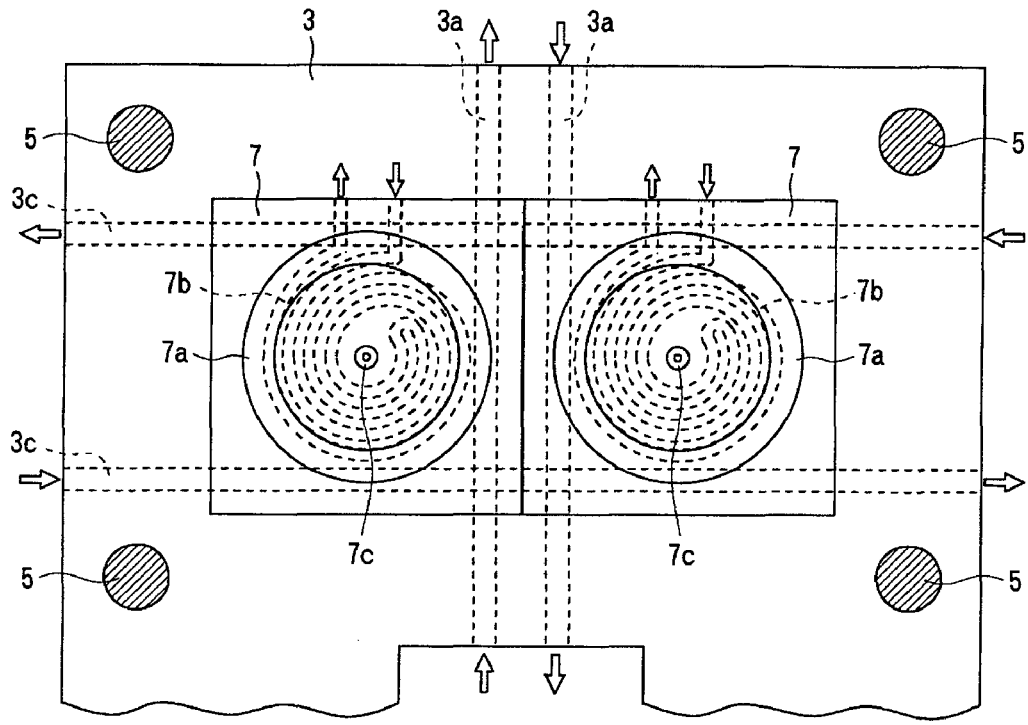
[Figure 8]
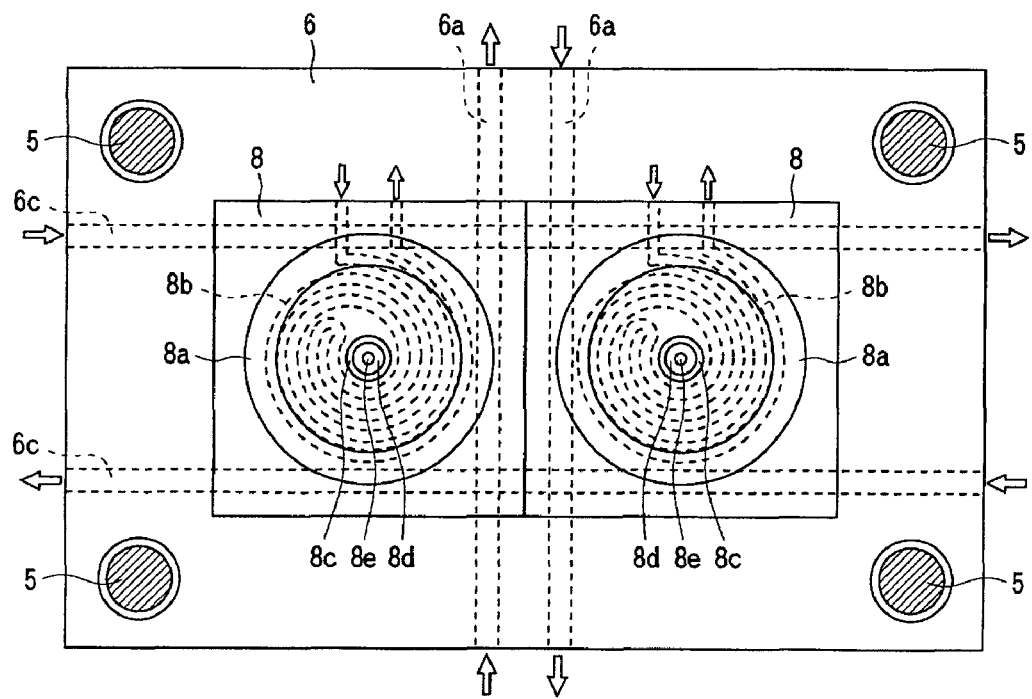

[Figure 9]
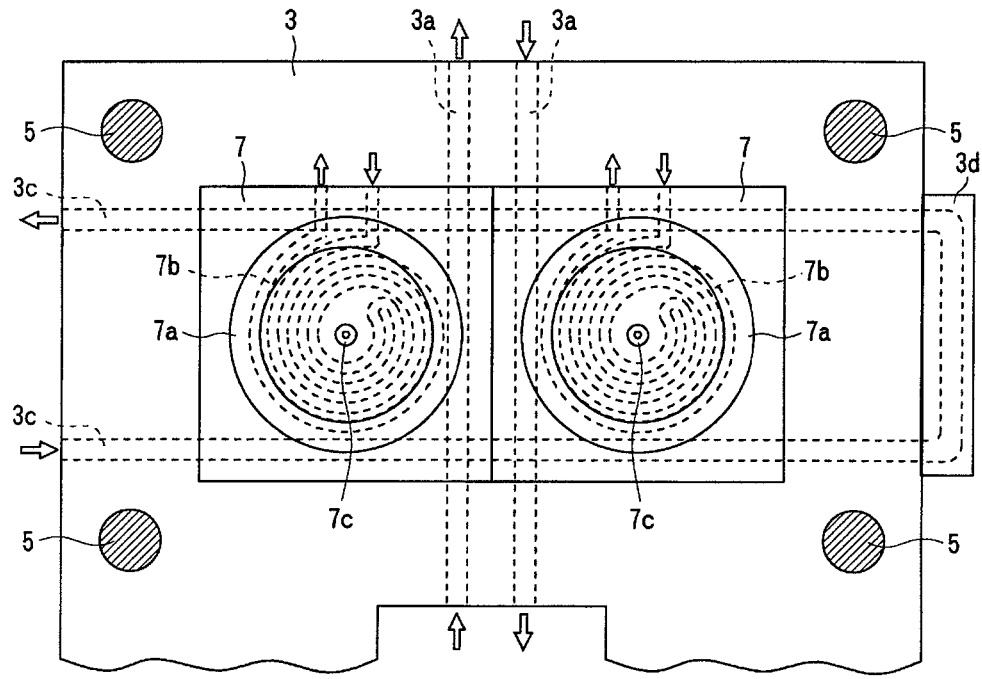
[Figure 10]
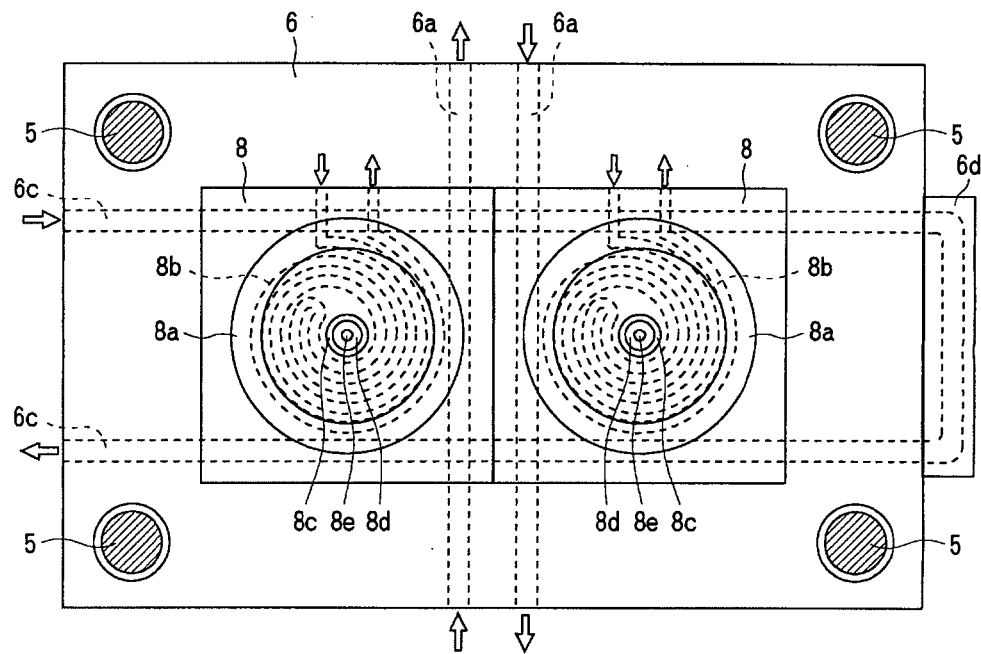

[Figure 11]
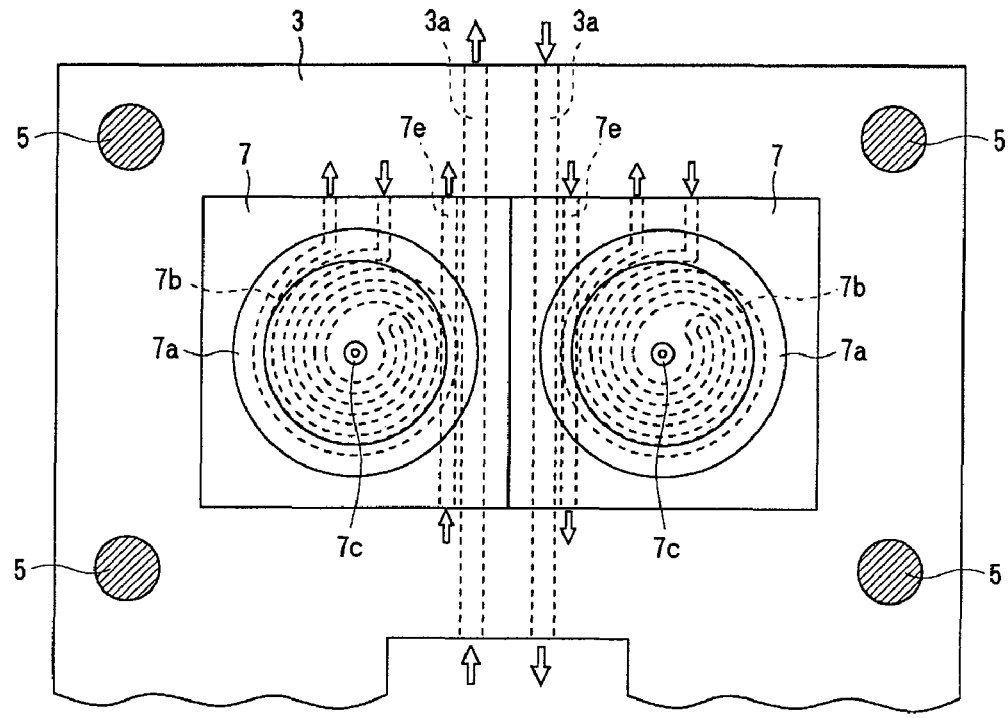
[Figure 12]
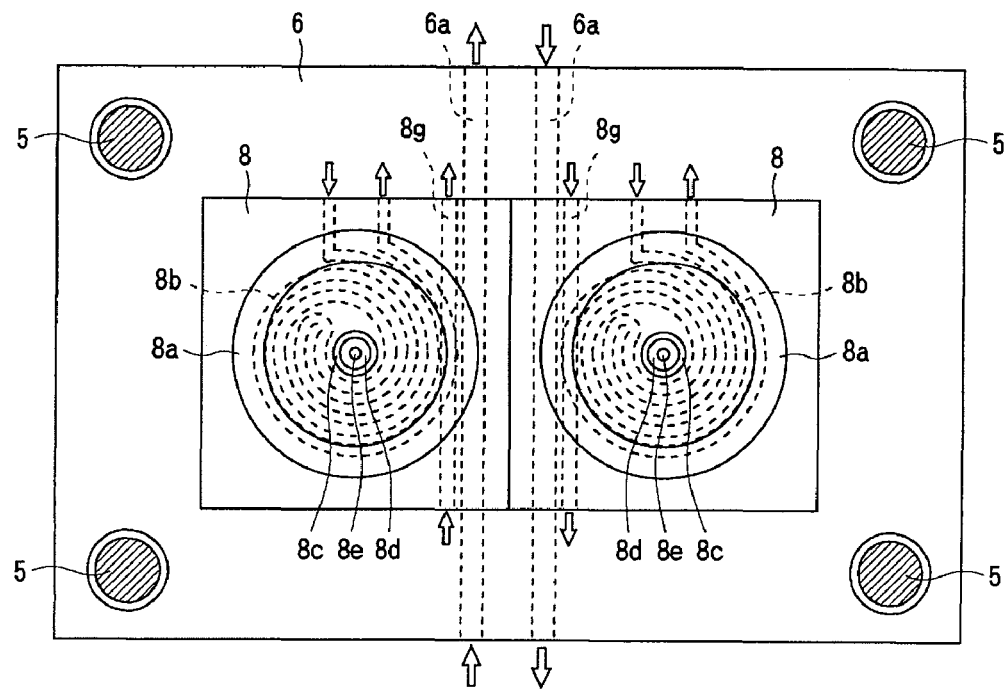

[Figure 1 3]
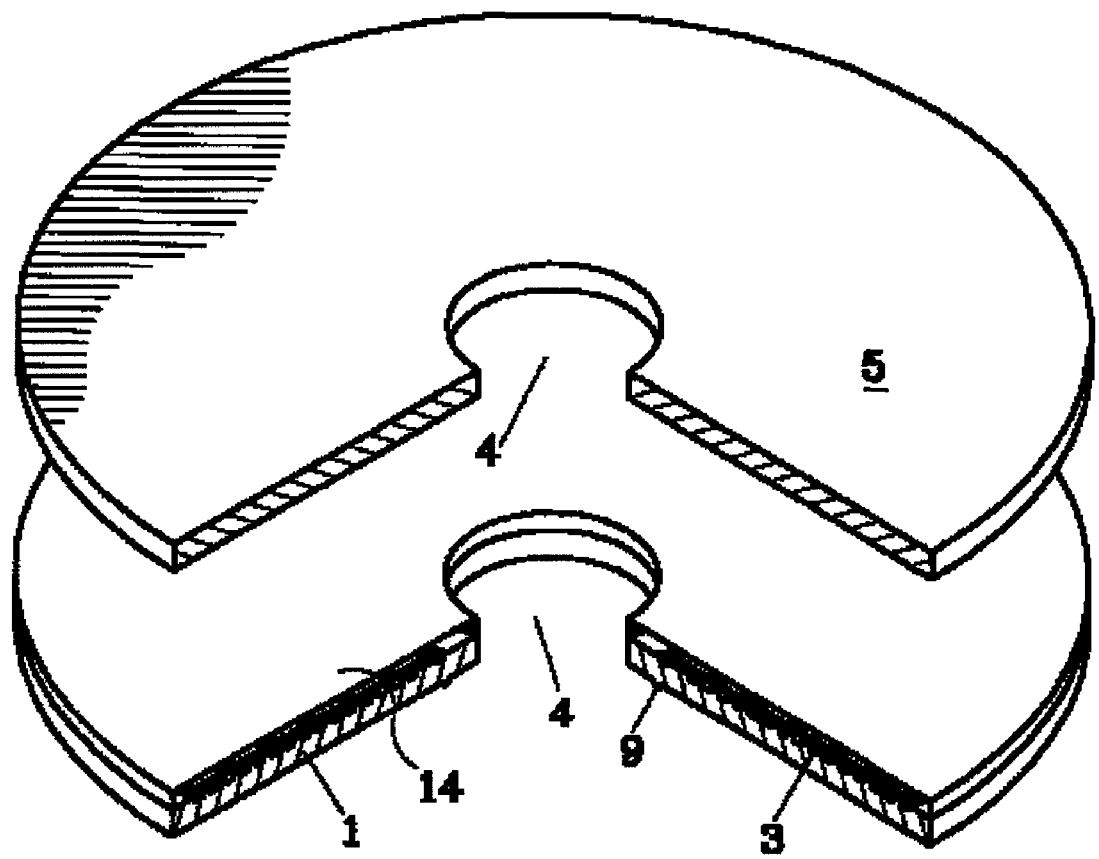

METHOD FOR MANUFACTURING OPTICAL DISC AND OPTICAL DISC

CROSS-REFERENCE TO RELATED APPLICATIONS

This application is a divisional application of U.S. patent application Ser. No. 11/093,084, filed Mar. 29, 2005, now U.S. Pat. No. 7,303,381 which claims priority to Japanese Patent Application No. 2004-100217, filed Mar. 30, 2004, the disclosure of which is incorporated herein by reference in its entirety.

BACKGROUND OF THE INVENTION

1. Field of the Invention

The present invention generally relates to an optical disc manufacturing device for manufacturing disc substrates used for optical discs, a method of manufacturing optical discs by mutually adhering a first disc substrate and a second disc substrate, and to an optical disc.

2. Description of the Related Art

An optical disc such as DVD, DVD–R or DVD+R or the like is typically formed by mutual adhesion of a first disc substrate and a second disc substrate that are manufactured by injection molding. In the injection molding, an injection molding device for securing a single disc substrate is generally employed. However, recently, in order to improve the productivity and space efficiency for the device, an injection molding device for securing double disc substrates in which disc substrates are molded simultaneously to be secured in two molds is sought to be put in practical use (e.g., Japanese Patent Laid-open No. JP-A-8-224763).

In the injection molding device for securing double disc substrates, it is general to provide two fixed molds parallel to each other on a fixed platen with the two fixed molds spaced apart and provide two movable molds parallel to each other on a movable platen with the two movable molds spaced apart. However, in order to have much more injection molding devices installed in limited space, the width of the injection molding device should be shorter. Accordingly, it is necessary that the distance between the two fixed molds and the distance between the two movable molds, more specifically a distance between two molds be zero or near zero.

However, a heat radiating efficiency in a boundary part of the molds causes the temperature at the same part during the injecting process and the hardening process to be higher than those of the other parts, when the distance is zero or near zero.

The fixed molds and the movable molds constituting the mold is appropriately provided with temperature controlling flow passages for a heating medium to uniform the temperature throughout the mold in the injecting process and the hardening process. However, it is difficult to completely remove temperature differences even though concentrated studies on different shapes of the temperature controlling flow passages are made. As a result, the temperature difference is still transferred and generated in a plastic in cavities, thereby causing unevenness of thickness in the disc substrates molded by each of the molds.

SUMMARY OF THE INVENTION

The present invention has been made to solve at least one of the above problems. In one or more aspects, an advantage of the invention is that it provides an optical disc manufacturing device in which a plurality of disc substrates are molded simultaneously to be secured in a plurality of molds, and the optical disc manufacturing device can prevent a thickness unevenness in the disc substrates molded in the molds from being generated even when a distance between the plurality of molds is zero or near zero, a method of manufacturing an optical disc using the manufacturing device, and an optical disc manufactured by use of the manufacturing method.

In order to achieve the above advantage, according to an aspect of the present invention, an optical disc manufacturing device in which a plurality of disc substrates are molded simultaneously to be secured in a plurality of molds is characterized in that a plurality of fixed molds are mounted parallel to each other on a fixed platen and the same number of movable molds as that of the fixed molds are mounted parallel to each other on a movable platen, and temperature controlling flow passages are provided between the fixed molds mounted parallel to each other on the fixed platen and/or between the movable molds mounted parallel to each other on the movable platen.

In addition, according to an another aspect of the present invention, the method of manufacturing optical discs according to the present invention in which an optical disc manufacturing device for molding a plurality of disc substrates simultaneously to secure the substrates in a first mold and a second mold is employed to adhere a first disc substrate to a second disc substrate, includes molding the first disc substrate molded by the first mold simultaneously with the second disc substrate molded by the second mold, applying an adhesive on the molded first disc substrate, and adhering the second disc substrate to the first disc substrate by means of the adhesive.

In addition, according to a still another aspect of the present invention, an optical disc which is formed by mutual adhesion of a first disc substrate and a second disc substrate is characterized in that an manufacturing device of an optical disc for molding a plurality of disc substrates simultaneously to secure the substrates in a first mold and a second mold is employed to adhere the first disc substrate to the second disc substrate, the second disc substrate molded by the second mold is adhered to the first disc substrate molded by the first mold by means of the adhesive.

According to the optical disc manufacturing device, the method of manufacturing optical discs and optical discs, the temperature controlling flow passages for a heating medium are provided at the boundary part of at least one of the fixed platen and the movable platen. Therefore, the heating medium is flown in the temperature controlling flow passages, thereby preventing the temperature at the boundary part between the molds from being higher than those of the other parts in the injecting process and in the hardening process, and preventing the temperature difference from being generated in plastic in the cavities. This in turn results in high-quality optical discs having uniform thickness in the disc substrate molded by each of the molds.

In all of the aforesaid embodiments, any element used in an embodiment can interchangeably be used in another embodiment unless such a replacement is not feasible or causes adverse effect. Further, the present invention can equally be applied to apparatuses and methods.

According to at least one aspect of the present invention, it is possible to provide the optical disc manufacturing device and a manufacturing method of an optical disc which can prevent a thickness unevenness in the disc substrates molded by each of the molds from being generated even when a distance between a plurality of molds is zero or near zero, and an optical disc having uniform thickness.

For purposes of summarizing the invention and the advantages achieved over the related art, certain objects and advantages of the invention have been described above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

BRIEF DESCRIPTION OF THE DRAWINGS

These and other features of this invention will now be described with reference to the drawings of preferred embodiments which are intended to illustrate and not to limit the invention. The drawings are oversimplified for illustrative purposes.

FIG. 1 is a top view of an injection molding device illustrating a first embodiment of the present invention;

FIG. 2 is a cross-sectional view taken along the line a-a in FIG. 1;

FIG. 3 is a cross-sectional view taken along the line b-b in FIG. 1;

FIG. 4 is a view illustrating the structure of a mold and explaining a molding operation;

FIG. 5 is a view corresponding to FIG. 2 illustrating a second embodiment of the invention;

FIG. 6 is a view corresponding to FIG. 3 illustrating the second embodiment of the invention;

FIG. 7 is a view corresponding to FIG. 2 illustrating a third embodiment of the invention;

FIG. 8 is a view corresponding to FIG. 3 illustrating the third embodiment of the invention;

FIG. 9 is a view corresponding to FIG. 2 illustrating a fourth embodiment of the invention;

FIG. 10 is a view corresponding to FIG. 3 illustrating the fourth embodiment of the invention;

FIG. 11 is a view corresponding to FIG. 2 illustrating a fifth embodiment of the invention;

FIG. 12 is a view corresponding to FIG. 3 illustrating the fifth embodiment of the invention; and FIG. 13 is a view illustrating the structure of an optical disc according to an embodiment of the invention.

DESCRIPTION OF THE PREFERRED EMBODIMENTS

FIGS. 1 to 4 illustrate a first embodiment of the invention. FIG. 1 is a top view of an injection molding device that is an manufacturing device of an optical disc, FIG. 2 is a cross-sectional view taken along the line a-a in FIG. 1, FIG. 3 is a cross-sectional view taken along the line b-b in FIG. 1, and FIG. 4 is a partial cross-sectional view of a fixed mold and a movable mold and is also an explanatory view of a molding operation.

The injection molding device 1 includes a mount 2, and a fixed platen 3 and a supporting platen 4 provided on the mount 1 such that the fixed platen 3 and the supporting platen 4 face to each other. Further, the fixed platen 3 and the supporting platen 4 are provided with four tie bars 5, and the tie bars 5 are respectively provided with a movable platen 6 free to move back and forth.

In addition, two fixed molds 7 are mounted parallel to each other on a surface of the fixed platen 3 facing the movable platen 6 with a distance between them being zero or near zero, and two movable molds 8 are mounted parallel to each other on a surface of the movable platen 6 facing the fixed platen 3 with a distance between them being zero or near zero. Two pairs of the fixed molds 7 and the movable molds 8 facing each other to in the left and right in FIG. 1 constitute molds for molding disc substrates DS (see FIG. 4D), respectively.

Furthermore, the supporting platen 4 is provided with a driving mechanism 9 to move the movable platen 6 back and forth, and the movable platen 6 is provided with a driving mechanism 10 for each of the movable molds 8 to move movable parts in the movable mold 8. Although not shown, each of the driving mechanisms 9 and 10 includes a motor, a ball screw rotated by the motor and a nut screwed with the ball screw, and the parts operating in conjunction with the ball screw or the nut causes the movable platen 6 to move back and forth and the movable parts in the movable mold 8 to move.

Meanwhile, two injection units (no reference numeral) for the respective molds are mounted parallel to each other on the mount 1. Each injection unit includes two supporting platens 11 and 12, two guide rods 13 provided at the two supporting platens 11 and 12, a slider 14 capable of being movable back and forth and provided at the guide rods 13, a cylinder 15 provided at the slider 14, a nozzle 16 provided at a front end of the cylinder 15, a heater 17 provided around the cylinder 15 and a hopper 18 provided at a base of the cylinder 17.

In addition, each injection unit includes a driving mechanism 19 for moving the slider 14 back and forth, a driving mechanism 20 for rotating a screw (not shown) in the cylinder 15 and a driving mechanism 21 for injection. Although not shown, each of the driving mechanisms 19 to 21 includes a motor, a ball screw rotated by the motor and a nut screwed with the ball screw, and the parts operating in conjunction with the ball screw or the nut allows the slider 14 (the cylinder 15) to move back and forth, the screw to rotate, and an injection operation in response to forward movement of the screw to be performed.

Hereinafter, a structure of the fixed mold 7 and the movable mold 8 will be described with reference to FIG. 4A.

The fixed mold 7 includes an annular fitting concave portion 7a on a surface thereof coming face to face with the movable mold 8 and a spiral passage 7b for controlling temperature at a portion near the cavity. Further, a sprue bush 7c is provided at a center of the fixed mold 7 and a passage 7d for controlling temperature at a center portion is provided around the sprue bush 7c.

On the other hand, the movable mold 8 includes an annular fitting convex portion 8a on the surface thereof coming face to face with the fixed mold 7 and a spiral passage 8b for controlling temperature at a portion near the cavity. Further, an ejector sleeve 8c, a gate cut sleeve 8d and an ejector pin 8e are movably provided at a center of the movable mold 8, and a passage 8f for controlling temperature at the center portion is provided around the gate cut sleeve 8d.

A disc-shaped cavity CV communicating with the sprue bush 7c is formed by fitting the concave portion 7a of the fixed mold 7 into the convex portion 8a of the movable mold 8. In addition, the passages 7d and 8f for controlling temperature at the center portion of the molds 7 and 8 respectively are connected to a low-temperature controller (not shown) for supplying a heating medium having a predetermined temperature to the passages 7d and 8f for controlling temperature at the center portion, and the passages 7b and 8b for controlling temperature at a portion near the cavity are connected to a high-temperature controller (not shown) for supplying a heating medium of temperature higher than that of the heating medium having a predetermined temperature.

As shown in FIG. 2, two fixed molds 7 are mounted parallel to each other on the fixed platen 3 with a distance between the molds being zero or near zero, and distances from the center of one of the fixed molds 7 to two tie bars 5 adjacent to the molds are equivalent, while distances from the center of the other fixed mold 7 to two tie bars 5 adjacent to the molds are equivalent. The distance between the molds being zero means that the two fixed molds 7 are in contact with each other, and the distance between the molds being near zero means the two fixed molds 7 are placed parallel to each other with a slight distance between the molds left. In FIG. 2, the reference numeral 7a indicates the annular fitting concave portion, and the reference numeral 7b indicates the spiral passage for controlling temperature at a portion near the cavity, and the reference numeral 7c indicates the sprue bush. The passage 7d for controlling temperature at the center portion is not shown in the drawing.

The temperature controlling flow passages are formed at locations corresponding to boundary parts of two fixed molds 7 of the fixed platen 3. The temperature controlling flow passage has two flow passages 3a extending upward and downward in FIG. 2. As clearly seen from FIG. 2, the left passage 3a in FIG. 2 is disposed along an outer side of a portion corresponding to a cavity in the fixed mold 7 on the left (in the vicinity of the right side of the fitting concave portion 7a in the drawing), and the passage 3a on the right in FIG. 2 is disposed along an outer side of a portion corresponding to a cavity in the fixed mold 7 on the right (in the vicinity of the left side of the fitting concave portion 7a in the drawing). The two flow passages 3a forming the temperature controlling flow passages are supplied with a heating medium from the low-temperature controller. In FIG. 2, the flowing directions of the heating medium in the temperature controlling flow passages (passages 3a) are indicated by outline arrows, and the flowing directions of the heating medium in both of the passages 3a may be the same.

As shown in FIG. 3, two movable molds 8 are mounted parallel to each other on the movable platen 6 with a distance between the molds being zero or near zero, and distances from the center of one of the movable molds 8 to two tie bars 5 adjacent to the mold are equivalent. The distance between the molds being zero means the two movable molds 8 are in contact with each other, and the distance between the molds being near zero means the two movable molds 8 are placed parallel to each other with a slight distance between the molds left. In FIG. 3, the reference numeral 8a is an annular fitting convex portion, and the reference numeral 8b is the spiral passage for controlling temperature at a portion near the cavity, and the reference numeral 8c is the ejector sleeve, and the reference numeral 8d is the gate cut sleeve, and the reference numeral 8e is the ejector pin. The temperature control passage 8f for center portion is not shown in the drawing.

The temperature controlling flow passages are formed at locations corresponding to the boundary parts of the two movable molds 8 of the movable platen 6. The temperature controlling flow passages comprised of two upward and downward flow passages 6a in FIG. 3. As can be seen from FIG. 3, a passage 6a is disposed along the outer side of a portion corresponding to a cavity of a movable mold 8 (in the vicinity of inside of the fitting convex portion 8a in the drawing), and the other passage 6a is disposed along the outer side of a portion corresponding to a cavity of the other movable mold 8 (in the vicinity of inside of the fitting convex portion 8a in the drawing). The two flow passages 6a forming the temperature controlling flow passages are supplied with a heating medium from the low-temperature controller. In FIG. 3, the flowing directions of the heating medium in the temperature controlling flow passages (passages 6a) are indicated by outline arrows, and the flowing directions of the heating medium in the passages 6a may be the same.

Hereinafter, a molding operation for a disc substrate DS performed by the injection molding device 1 will be described with reference to FIGS. 4B to 4D.

When a disc substrate DS is molded, as shown in FIG. 4B, first, the movable platen 6 is moved to the fixed platen 3 to have the two molds fit into each other. After the molds are fit into each other, the cylinders 15 of the two injection units are moved forward to make each nozzle 16 come into contact with the end of the sprue bush 7c, and the screws in the cylinders 15 are moved forward to have molten plastic injected into the cavities CV. In the injection, the gate cut sleeves 8d of the movable mold 8 are slightly protruded towards the fixed mold 7 to form a gate.

After the cavities CV is filled with the molten plastic, as shown in FIG. 4C, the gate cut sleeve 8d of each movable mold 8 is further protruded to the fixed mold 7 to shut the gate.

The molten plastic filled in the cavities CV is hardened due to the temperature dropping by the heat exchange between the heating medium flowing in the passage 7b for controlling temperature at a portion near the cavity in each of the fixed molds 7 and the heating medium flowing in the passage 8b for controlling temperature at a portion near the cavity in each of the movable molds 8. However, the distance between the two molds is zero or near zero, whereby the heat radiation efficiency in the boundary part of the molds is deteriorated and thus the temperature of the same part becomes higher than the other parts in the injecting process and the hardening process.

Therefore, in the injecting process and the hardening process, a heating medium is flown in the temperature controlling flow passages (passages 3a) provided at the fixed platen 3 and in the temperature controlling flow passages (passages 6a) provided at the movable platen 6 from the low-temperature controller to perform a supplementary heat exchange, the temperature of the boundary part in the molds is prevented from being higher than those of the other parts, and also the temperature difference is prevented from being transferred to the plastic P in the cavities CV to be generated.

After the plastic P filled in the cavities CV is hardened, as shown in FIG. 4D, the movable platen 6 is moved to a direction away from the fixed platen 3 to open the two molds fitted in each other, and the ejector sleeves 8c and the ejector pin 8e are made protruded to remove the sprue SR of the disc substrate DS.

As described above, according to the injection molding device and the injection molding method using the same, even when two fixed molds 7 are mounted parallel to each other on the fixed platen 3 with a distance between the molds being zero or near zero and two movable molds 8 are mounted parallel to each other on the movable platen 6 with a distance between the molds being zero or near zero, a heating medium is flown in the temperature controlling flow passages (passages 3a) provided in the position corresponding to the boundary part of the two fixed molds 7 on the fixed platen 3 and in the temperature controlling flow passages (passages 6a) provided in the position corresponding to the boundary part of the two movable molds 8 on the movable platen 6 from the low-temperature controller to perform supplementary heat exchanges in the injecting process and the hardening process. Accordingly, the temperature at the boundary part of the molds is prevented from being higher than those of the other parts, and also the temperature difference is not transferred to the plastic P in the cavities CV to be generated. As a consequence, thickness unevenness can be prevented from being transferred to be generated in the disc substrate molded by each of the molds, and high-quality optical discs with no thickness unevenness can be obtained.

In addition, each of the two passages 3a forming the temperature controlling flow passages of the fixed platen 3 is disposed along the outer side of a portion corresponding to a cavity adjacent to the molds and each of the passages 6a forming the temperature controlling flow passages of the movable platen 6 is disposed along the outer side of a portion corresponding to a cavity of the movable mold 8 so that the heat exchange of the plastic P in the cavities CV near the boundary part of the molds is effectively supplemented to thereby reliably prevent the temperature difference from being occurred in the plastic P in the cavities CV.

In addition, the heating medium flows in the temperature controlling flow passages (passages 3a) of the fixed platen 3 and in the temperature controlling flow passages (passages 6a) of the movable platen 6 from the low-temperature controller, whereby the heating medium flowing in each of the temperature controlling flow passages (passages 3a and 6a) exchanges heat further effectively to reliably prevent the thickness unevenness in the disc substrates due to the temperature difference from being generated.

FIGS. 5 to 6 illustrate a second embodiment of the present invention. What is different from the first embodiment illustrated in FIGS. 1 to 4 is that, as shown in FIG. 5, a joint 3b is provided on one opening side of the flow passages 3a of the temperature controlling flow passages provided in the fixed platen 3 so that the heating medium having flown in the passage 3a is caused to flow into the other passage 3a, and that as shown in FIG. 6, a joint 6b is provided on one opening side of the flow passages 6a of the temperature controlling flow passages provided in the movable platen 6 so that the heating medium having flown in the passage 6a is caused to flow into the other passage 6a.

Even when the heating medium flows as described above, the substantially same effect as the first embodiment can be obtained.

FIGS. 7 to 8 illustrate a third embodiment of the invention. What is different from the first embodiment illustrated in FIGS. 1 to 4 is that, as shown in FIG. 7, supplementary temperature controlling flow passages (passages 3c) independent from the temperature controlling flow passages (passages 3a) are provided on the fixed platen 3 substantially or nearly perpendicular to the temperature controlling flow passages (passages 3a), and that, as shown in FIG. 8, supplementary temperature controlling flow passages (passages 6c) independent from the temperature controlling flow passages (passages 6a) are provided on the movable platen 6 substantially or nearly perpendicular to the temperature controlling flow passages (passages 6a).

The supplementary temperature controlling flow passages of the fixed platen 3 comprise the two flow passages 3c, and, as can be seen from FIG. 7, the upper passage 3c in FIG. 7 is disposed along the outer side of the portions corresponding to cavities of the two fixed molds 7 mounted parallel to each other (in the vicinity of upper portions of the fitting concave portions 7a in the drawing), and the lower passage 3c in FIG. 7 is disposed along the outer side of the portions corresponding to cavities of the two fixed molds 7 (in the vicinity of lower portions of the fitting concave portions 7a in the drawing) and the both of the flow passages 3c are arranged in parallel with each other having a space therebetween to thereby pinch the portions corresponding to the cavities. The two flow passages 3c forming the supplementary temperature controlling flow passages are supplied with a heating medium from the low-temperature controller. In FIG. 7, the flowing directions of the heating medium in the supplementary temperature controlling flow passages (passages 3c) are indicated by outline arrows, and the flowing directions of the heating medium in the passages 3c may be same.

In addition, the supplementary temperature controlling flow passages of the movable platen 6 comprise two flow passages 6c, and, as can be seen from FIG. 8, the upper passage 6c in FIG. 8 is disposed along the outer side of the portions corresponding to cavities of the two movable molds 8 mounted parallel to each other (in the vicinity of upper portions of the fitting convex portions 8a in the drawing), and the lower passage 6c in FIG. 8 is disposed along the outer side of the portions corresponding to cavities of the two movable molds 8 (in the vicinity of lower portions of the fitting convex portions 8a in the drawing), and the two flow passages 6c are provided in parallel with each other having a space therebetween to thereby pinch the portions corresponding to the cavities. The two flow passages 6c forming the supplementary temperature controlling flow passages are supplied with a heating medium from the low-temperature controller. In FIG. 8, the flowing directions of the heating medium in the supplementary temperature controlling flow passages (passages 6c) are indicated by outline arrows, and the flowing directions of the heating medium in the passages 6c may be same.

These supplementary temperature controlling flow passages (passages 3c and 6c) allow the supplementary heat exchange to be performed further reliably in cooperation with the temperature controlling flow passages (passages 3a and 6a) Other effects are the same as in the first embodiment.

FIGS. 9 to 10 illustrate a fourth embodiment of the invention. What is different from the first embodiment illustrated in FIGS. 1 to 4 is that the temperature controlling flow passages (passages 3a and 6a) and the supplementary temperature controlling flow passages (passages 3c and 6c) are provided in the fixed platen 3 and the movable platen 4 similar to the third embodiment, that, as shown in FIG. 9, a joint 3d is provided on one opening side of the flow passages 3c of the supplementary temperature controlling flow passages provided in the fixed platen 3 so that the heating medium having flown in the passage 3c is caused to flow into the other passage 3c, and that, as shown in FIG. 10, a joint 6d is provided on one opening side of the flow passages 6c of the supplementary temperature controlling flow passages provided in the movable platen 6 so that the heating medium having flown in the passage 6c is caused to flow into the other passage 6c.

Even when the heating medium flows as described above, the substantially same effect as the third embodiment can be obtained.

FIGS. 11 to 12 illustrate a fifth embodiment of the invention. What is different from the first embodiment illustrated in FIGS. 1 to 4 is that, as shown in FIG. 11, supplementary temperature controlling flow passages (passages 7e) that can exchange heat with the temperature controlling flow passages (passages 3a) of the fixed platen are provided 3 substantially in parallel with the temperature control passage (passage 3a) in each of the fixed molds 7 provided in the fixed platen 3, and that, as shown in FIG. 12, supplementary temperature controlling flow passages (passages 8g) that can exchange heat with the temperature controlling flow passages (passages 6a) of the movable platen 6 are provided substantially in parallel with the temperature control passage (passage 6a) provided in each of the movable platen 6.

The supplementary temperature control passage of each of the fixed molds 7 has a single passage 7e, and, as can be seen from FIG. 11, the passage 7e of the left fixed mold 7 in FIG. 11 is disposed along the outer side of a portion corresponding to a cavity of the fixed mold 7 (in the vicinity of the left side of the fitting concave portion 7a in the drawing), the passage 7e of the right fixed mold 7 in FIG. 11 is disposed along the outer side of a portion corresponding to a cavity of the fixed mold 7 (in the vicinity of the right side of the fitting concave portion 7a in the drawing), and each of them is located between the passage 3a of the fixed platen 3 and the outer circumferential portion of the passage 7b for controlling temperature at a portion near the cavity in the fixed mold 7. The passage 7e forming the supplementary temperature controlling flow passages is supplied with heating medium from the low-temperature controller as described above. In FIG. 11, the flowing directions of the heating medium in the supplementary temperature controlling flow passages (passages 7e) are indicated by outline arrows, and the flowing directions of the heating medium in the passages 7e of individual fixed molds 7 may be the same. Needless to say, it is possible that the joint described above is provided at an opening side of one of the passages 7e of each of the fixed molds 7 to make the heating medium having flown in the passage 7e of the fixed mold 7 flow into a passage 7e of the other fixed mold 7.

The supplementary temperature control passage of each of the movable molds 8 has a single passage 8g. As can be seen from FIG. 12, the passage 8g of the left movable mold 8 in FIG. 12 is disposed along the outer side of a portion corresponding to a cavity of the movable mold 8 (in the vicinity of the right side of the fitting convex portion 8a in the drawing), the passage 8g of the right movable mold 8 in FIG. 12 is disposed along the outer side of a portion corresponding to a cavity of the movable mold 8 (in the vicinity of the left side of the fitting convex portion 8a in the drawing), and each of them is located between the passage 6a of the movable platen 6 and the outer circumferential portion of the passage 8b for controlling temperature at a portion near the cavity of the movable mold 8. The passages 8g forming the supplementary temperature controlling flow passages are supplied with a heating medium from the low-temperature controller as described above. In FIG. 12, the flowing directions of the heating medium in the supplementary temperature controlling flow passages (passages 8g) are indicated by outline arrows, and the flowing directions of the heating medium in the passage 8g of individual movable molds 8 may be the same. Needless to say, a joint as described above may be provided at one opening of the passage 8g of the individual movable molds 8 to make the heating medium having flown in the passage 8g of the movable mold 8 flow into the other passage 8g of the other movable mold 8.

By employing the supplementary temperature controlling flow passages (passages 7e and 8g) to use them as relay means for heat exchange, the supplementary heat exchange can be performed further sufficiently by the temperature controlling flow passages (passages 3a and 6a). Other effects are the same as in the first embodiment.

FIG. 13 illustrates the structure of an optical disc based on each of the embodiments described above.

In FIG. 13, a first disc substrate 1 is a transparent disc-shaped substrate having a center hole 4 in the center. Generally, the substrate 1 is manufactured by the injection molding of transparent resins such as polycarbonate, polymethylmethacrylate (PMMA) or the like. A clamping area is provided in the outer side of the center hole 4 on a surface of the substrate 1, and the outer circumferential side of the clamping area becomes a data recording area. The data recording area of the substrate 1 is formed with a tracking guide 3 including spiral grooves.

A recording layer 12 is formed on the main surface of the data recording area of the first disc substrate. For example, an organic dye or the like is coated on that area by a spin coat method or the like to form the recording layer 12.

A reflective layer 13 comprised of a metallic film such as gold, aluminum, silver, copper or the like or alloy thereof is formed on the recording layer 12. Further, on the reflective layer 13 is formed a protective layer 14 of ultraviolet cured resin or the like.

As shown in FIG. 13, in addition to the first disc substrate 1, a second disc substrate 5 is prepared. The substrate 5 is to protect the recording surface or to secure the strength of the optical disc. The substrate 5 is manufactured with the same materials as the transparent substrate 1, and has the same size as the transparent substrate 1. However, on a main surface of the substrate 5 is not formed the tracking guide 3, the recording layer 12 and the reflective layer 13 dissimilar to the translucent substrate 1. However, it is possible to provide the recording layer 12 or the reflective layer 13 or the like on the substrate 5 including the tracking guide 3 similar to the transparent substrate 5.

Next, the two substrates 1 and 5 are adhered together. A responsive cured resin as an adhesive is applied to a main surface of at least one of the two substrates 1 and 5, for example, by means of a spin coat method or a screen printing method or the like, and further the main surfaces of the two substrates are come face to face with each other to be overlaid, and then the responsive cured resin is hardened. Accordingly, an adhesive layer 11 formed by the hardening of the responsive cured resin causes the main surfaces of the two substrates 1 and 5 to be adhered together. The adhesive layer 11 may also function as the protective layer 14.

When an optical disc as described above is manufactured, in the optical disc manufacturing device of each of the embodiments as described above, the first disc substrate is molded by the first mold, the second disc substrate is molded by the second mold, and then the substrates molded simultaneously are adhered together to form an optical disc. Therefore, an optical disc with little thickness unevenness can be manufactured.

In addition, in the first to fifth embodiments, the temperature controlling flow passages are provided in both of the fixed platen and the movable platen. However, the temperature controlling flow passages may be provided in either of the fixed platen or the movable platen. Further, in the third embodiment, the supplementary temperature controlling flow passages are provided in both of the fixed platen and the movable platen. However, the supplementary temperature controlling flow passages may be provided in either the fixed platen or the movable platen. Furthermore, in the fifth embodiment, the supplementary temperature controlling flow passages are provided in the respective fixed molds mounted parallel to each other on the fixed platen and in the respective movable molds mounted parallel to each other on the movable platen. However, the supplementary temperature controlling flow passages may be provided in either the respective fixed molds or the movable molds.

In addition, in the first to fifth embodiments described above, it is exemplified that two molds for molding the disc substrate DS having a same specification are mounted parallel to each other. However, two injection molds corresponding to individual molds are provided, whereby molds with different specifications may be mounted parallel to each other to mold disc substrates with different specifications at the same time.

In addition, in the first to fifth embodiments described above, it is exemplified that two fixed molds on the fixed platen and the same number of movable molds as that of the fixed molds on the movable platen are mounted parallel to each other. Needless to say, the invention may also be applied and the same effect can be obtained even when more than two fixed molds on the fixed platen and the same number of movable molds as that of the fixed molds on the movable platen are mounted parallel to each other.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A method of manufacturing an optical disc, comprising:
   (i) controlling a temperature of first and second molds disposed side-by-side constituted by fixed molds mounted on a fixed platen and movable molds wherein the moveable molds move and fit the respective fixed molds to form cavities therebetween, by passing a temperature-controlling medium through temperature controlling flow passages provided in both the fixed and movable platens in the vicinity of a boundary between the first and second molds, and by passing a temperature-controlling medium through supplementary temperature controlling flow passages independent from the temperature controlling flow passages, which are formed substantially or nearly perpendicular to the temperature controlling flow passages as viewed in the axial direction of the molds in at least one of the fixed platen or the movable platen, wherein the supplementary temperature controlling flow passages are provided on either side of the cavities so as to sandwich the cavities as viewed in the axial direction of the molds;
   (ii) molding a first disc substrate by the first mold simultaneously with a second disc substrate by the second mold while controlling the temperature of the first and second molds by step (i);
   (iii) upon releasing the molded first and second disc substrates, applying an adhesive onto the molded first disc substrate, and
   (iv) attaching the second disc substrate to the first disc substrate by means of the adhesive.

2. The method according to claim 1, wherein step (i) further comprises controlling the temperature of each mold by passing a temperature-controlling medium through a passage provided at a center portion of the mold and a passage provided near a cavity portion of the mold.

3. The method according to claim 1, wherein step (i) further comprises controlling the temperature of each mold by passing a temperature-controlling medium through a passage provided at a center portion of the mold and a passage provided near a cavity portion of the mold, wherein
   the passage provided at each center portion and the supplementary temperature controlling flow passages are connected to each other, and in step (i), a first heating medium as the temperature-controlling medium is supplied to the passage provided at each center portion and the supplementary temperature controlling flow passages, whereas a second heating medium having a temperature higher than that of the first heating medium is supplied to the passage provided near each cavity portion.

4. The method of manufacturing optical discs according to claim 1, wherein the first disc substrate is a recording disc substrate on which information is to be recorded by a laser beam.

5. The method of manufacturing optical discs according to claim 1, wherein the second disc substrate is a protective disc substrate for protecting a recording surface.

6. The method of manufacturing optical discs according to claim 4, wherein the second disc substrate is a protective disc substrate for protecting a recording surface.

* * * * *